(12) United States Patent
Chen et al.

(10) Patent No.: US 7,792,786 B2
(45) Date of Patent: *Sep. 7, 2010

(54) METHODOLOGIES AND ANALYTICS TOOLS FOR LOCATING EXPERTS WITH SPECIFIC SETS OF EXPERTISE

(75) Inventors: Ying Chen, San Jose, CA (US); Jeffrey Thomas Kreulen, San Jose, CA (US); Ana Lelescu, San Jose, CA (US); James J. Rhodes, Los Gatos, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/674,606

(22) Filed: Feb. 13, 2007

(65) Prior Publication Data
US 2008/0195611 A1    Aug. 14, 2008

(51) Int. Cl.
*G06F 7/00*    (2006.01)
*G06F 17/30*   (2006.01)

(52) U.S. Cl. .................. 707/603; 707/777; 707/807

(58) Field of Classification Search .............. None
See application file for complete search history.

(56) References Cited

U.S. PATENT DOCUMENTS

| | | | |
|---|---|---|---|
| 6,055,515 A * | 4/2000 | Consentino et al. | 705/27 |
| 6,424,971 B1 * | 7/2002 | Kreulen et al. | 1/1 |
| 6,711,585 B1 * | 3/2004 | Copperman et al. | 1/1 |
| 2001/0044758 A1 * | 11/2001 | Talib et al. | 705/27 |
| 2003/0084066 A1 | 5/2003 | Waterman et al. | |
| 2003/0130994 A1 | 7/2003 | Singh et al. | |
| 2004/0093321 A1 | 5/2004 | Roustant et al. | |
| 2004/0172393 A1 | 9/2004 | Kazi et al. | |
| 2004/0230461 A1 * | 11/2004 | Talib et al. | 705/7 |
| 2004/0230572 A1 | 11/2004 | Omoigui | |

OTHER PUBLICATIONS

Mutschke et al.,"Collaboration and cognitive structures in social science research fields", Scientometrics, vol. 52, No. 3, 487-502, Budapest, Hungary, 2001.

Widhalm et al., "Co-occurrence and knowledge mapping to identify hot topics and key players in the field of mobility and transport", Proceedings of the 8th Conference of the International Society for Scientometrics and Informetrics ISSI, vol. 2, pp. 751-758, Sydney, Australia, 2001.

(Continued)

*Primary Examiner*—Pierre M Vital
*Assistant Examiner*—Berhanu Mitiku
(74) *Attorney, Agent, or Firm*—Shimokaji & Assoc., P.C.

(57) ABSTRACT

A method and analytics tools for locating experts with specific sets of expertise are disclosed, the method including providing a collection of documents $P_0$; generating categories representing fields of expertise derived from the collection of documents $P_0$; refining the taxonomy of the categories by applying user domain knowledge; extracting structured fields from the collection of documents $P_0$; constructing a contingency table having a first axis defined by the extracted structured fields and a second axis defined by the categories; and using the contingency table to identify a set of experts having a related expertise. The method may also include a network graph analysis that aids visualization of the relationship between people and expertise.

2 Claims, 9 Drawing Sheets

OTHER PUBLICATIONS

Kautz et al., "Combining Social Networks and Collaborative Filtering", Communications of the ACM, vol. 40, No. 3, US, Mar. 1997.

Cao et al., "Research on expert search at enterprise track of TREC 2005", Fourteenth Text REtrieval Conference (TREC 2005), Gaithersburg, Maryland, US, Nov. 15-18, 2005.

Rasmussen, E., "Clustering Algorithms", in Frakes, W. B. and Baeza-Yates, R., editors, Information Retrieval, Data Structures and Algorithms, pp. 419-442, Prentice Hall, Englewood Cliffs, New Jersey (1992).

Press, et al., "Numerical Recipes in C, second edition", pp. 620-623, New York, Cambridge University Press, (1992).

\* cited by examiner

200

"Investigate" Phase Includes: /201

A) Using a search tool to extract seed documents, $P_0$, containing descriptions of the expertise of a set of people in a specific domain of interests, form a data warehouse;
B) Using an analytics technology to convert each document with a numeric vector that corresponds to its word, feature, and structured information content;
C) In some cases, using a nearest neighbor technology to identify related documents, $P_1$, that were outside of the original seed documents.

"Comprehend" Phase Includes: /202

A) Using a taxonomy generation technology to classify the selected documents, i.e., $P_0 + P_1$, into appropriate categories, using the numeric vector space and the feature space created for the combined related documents and the seed documents, i.e., $P_0 + P_1$, and using an interactive clustering of the feature space that helps a domain expert refine the feature space if desired;
B) If people's names are not a structured field in the data warehouse, or the name field is irrelevant to the expertise, introducing a name-annotation step to extract the human names out of the documents and considering such names as the structured field in the data warehouse;
C) Alternatively, if the document authors names exist and can be used for such analysis, and the names exist as structured fields in the data warehouse, using such structured fields directly without introducing the names-annotation step.

"Examine" Phase Includes: /203

A) Using a contingency method to compare the document taxonomy against the names to identify who is highly associated with what categories of documents, or one person classification with another person classification to see who have similar expertise;
B) Using trending tool that overlays document time information on top of document categories to comprehend how recent are charges in, e.g., the expertise, and other changes;
C) Using a network graph analysis to demonstrate the relationships among people and relationships among people and their expertise.

METHODOLOGIES AND ANALYTICS TOOLS FOR LOCATING EXPERTS WITH SPECIFIC SETS OF EXPERTISE

BACKGROUND OF THE INVENTION

The present invention relates generally to the field of information analytics tools, and methods for data mining and, more specifically, to using structured and unstructured information for the identification of experts for a given set of expertise.

In today's business consulting services world, often a team of consultants with different kinds of expertise must be quickly put together to respond to a potential client engagement or to address a client issue. Fast and dynamic team building capability is critical to the success of a business consulting service organization. To acquire such ability, one key component is to be able to identify an appropriate consulting team with appropriate expertise quickly. Fortunately, most of the consulting organizations maintain significant amounts of information in the form of documents, typically texts in a knowledge base which contain information, for example, regarding which consultants have been working on which kinds of projects. Such types of information, if mined properly, can give insights into who has what kinds of expertise.

Today, consulting organizations often cope with such issues via the word-of-mouth approach, which can be ad hoc, unreliable, and slow. A better approach is needed.

SUMMARY OF THE INVENTION

In one embodiment of the present invention, a method for use with a collection of documents $P_0$ comprises: generating categories representing fields of expertise derived from the collection of documents $P_0$; extracting structured fields from the collection of documents $P_0$; constructing a contingency table having a first axis defined by the extracted structured fields and a second axis defined by the categories; and using the contingency table to identify a set of experts having a related expertise.

In another embodiment of the present invention, a method for use with a set of seed documents $P_0$ extracted from a data warehouse comprises: searching the data warehouse to provide a set of additional documents $P_1$ similar to documents of $P_0$, wherein the similarity is determined using a statistical method; generating an initial taxonomy for a combined document set $P_0+P_1$ that includes all documents from both the set of seed documents $P_0$ and the set of additional documents $P_1$; and iterating the processes of extracting, searching, and generating using domain knowledge to produce a refined taxonomy from the initial taxonomy.

In still another embodiment of the present invention, a computer program product comprises a computer useable medium including a computer readable program, wherein the computer readable program when executed on a computer causes the computer to: find a relationship between categories of a taxonomy and a collection of names of people derived from structured fields used to classify a set of documents from a data warehouse; plot the relationship as a network graph; and perform a network graph analysis to find a set of names from the collection of names of people that is most related to a set of the categories of the taxonomy.

Yet another embodiment of the present invention is a computer program product for use with a collection of documents $P_0$, the computer program product comprising a computer useable medium including a computer readable program, wherein the computer readable program when executed on a computer causes the computer to: generate categories representing fields of expertise derived from the collection of documents $P_0$; extract structured fields from the collection of documents $P_0$; construct a contingency table having a first axis defined by the extracted structured fields and a second axis defined by the categories; and identify, using the contingency table, a set of experts having a related expertise.

These and other features, aspects and advantages of the present invention will become better understood with reference to the following drawings, description and claims.

BRIEF DESCRIPTION OF THE DRAWINGS

FIG. 2 is flowchart illustrating phases of a methodology for locating experts with specific sets of expertise in accordance with an embodiment of the present invention;

FIG. 5, comprising

FIG. 7 is an illustration of a contingency table for a process of the method of FIG. 3.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide systems and methods of data mining for locating experts with specific sets of expertise. Embodiments of the present invention provide analytics tools, and methodologies involving those tools, for assisting in numerous stages of the identification of experts for a given set of expertise using structured and unstructured information. Embodiments may be used, for example, by business consulting services in conjunction with a data warehouse, e.g., a large commercial database, for example, for locating a team of consultants having various distinct and specified kinds of expertise required to respond to a potential client engagement or to address a client issue.

By enabling the use of user domain-specific knowledge to filter information and efficiently and effectively narrow search results, embodiments of the present invention differ from prior art search techniques that do not have a capability to employ such domain-specific knowledge.

Figure 1:
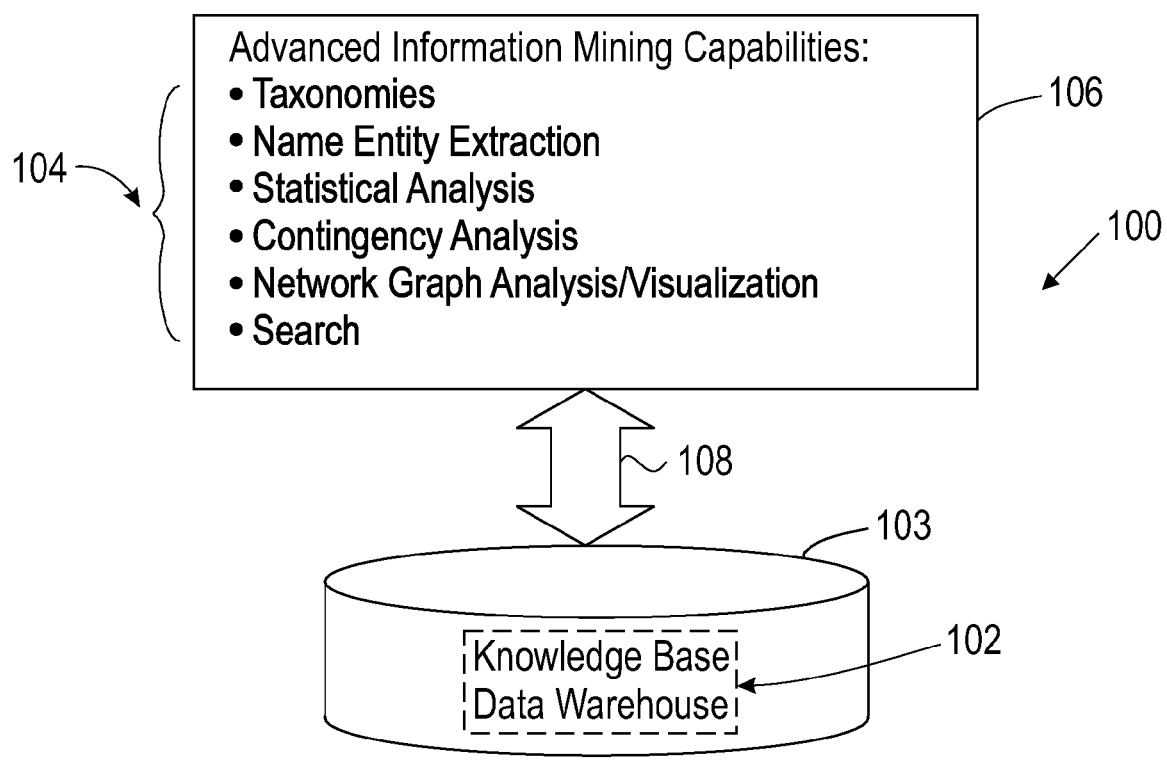
FIG. 1 is a system block diagram illustrating a system for locating experts with specific sets of expertise in accordance with an embodiment of the present invention.

FIG. 1 illustrates information retrieval system 100 in accordance with one embodiment of the present invention. To address the major issues in the expertise location process, information retrieval system 100 may utilize a set of analytics tools to link people with their expertise and allow easy location of information pertaining to people and their expertise. The analytics tool set may contain a knowledge base data warehouse 102 and a set of analytics tools 104, for identifying expertise for people as shown in FIG. 1. The data warehouse 102 may be implemented using computer-readable storage devices 103. Computer-readable storage devices 103 may communicate with a computer system 106 via a network, electronic, or other communication path 108. Computer system 106 may provide an interface for a human user to access data warehouse 102 and may be used to implement and provide a human user interface for analytics tools 104. Data warehouse 102 may contain documents that include the people information as well as other kinds of information that are helpful in analysis, for example, structured fields on people's titles and ranks. The analytics tools 104 may provide functions including, for example, exploring the data warehouse 102 and analyzing various relationships among documents and people. As indicated in FIG. 1, analytics tools 104 may include capabilities for providing an end user with, for example, taxonomies, name entity extraction, statistical analyses, contingency analyses, and network graph analysis and visualization.

Referring now to FIG. 2, a method 200 of one embodiment of the present invention may comprise an investigate phase 201 of processes, a comprehend phase 202 of processes, and an examine phase 203 of processes.

The investigate phase 201 may use a search tool, e.g., from the set of analytics tools 104, to extract a set of seed documents, $P_0$, that contains the descriptions of the expertise of a set of people in a specific domain of interests from a data warehouse, e.g., data warehouse 102. Next an analytics technology—e.g., from the set of analytics tools 104 and described in more detail below—may convert each document with a numeric vector that corresponds to its word, feature, and structured information content. In some cases, a nearest neighbor technology (i.e., measuring distance between vectors using a metric such as "cosine distance") that identifies the related documents, $P_1$, that were outside of the original seed documents, $P_0$, may also be used.

The comprehend phase 202 may use a document classification technology (also called "taxonomy generation technology")—e.g., from the set of analytics tools 104 and described in more detail below—to classify the selected documents, e.g., combined document set $P_0+P_1$ comprising all documents from both sets $P_0$ and $P_1$, into appropriate categories. Such a classification technology may use the numeric vector space and the feature space created for the combined related documents and the seed documents, i.e., $P_0+P_1$. Furthermore, the document classification technology may use an interactive clustering of the feature space that can help a domain expert refine the feature space if desired. Next, if people's names are not a structured field in the data warehouse 102, or the name field is irrelevant to the expertise, a name-annotation step—e.g., from the set of analytics tools 104 and described in more detail below—may be introduced to extract the human names out of the documents. Such names can be considered as the structured field in the data warehouse 102. Alternatively, if the document authors exist and can be used for such classification analysis, and the authors' names exist as structured fields in the data warehouse 102, such structured fields can be used directly without the name-annotation step.

The examine phase 203 may use a contingency table analysis—e.g., from the set of analytics tools 104 and described in more detail below—that compares the document taxonomy (obtained from the classification analysis) against the authors' names to identify who is highly associated with what categories of documents. The contingency table analysis may also be used to compare one person classification with another person classification to see who have similar expertise. Furthermore, a trending tool—e.g., from the set of analytics tools 104 and described in more detail below—that overlays document time information on top of document categories may be used to comprehend the recentness of the expertise (or other) changes. In addition, a network graph analysis—e.g., from the set of analytics tools 104 and described in more detail below—may be used to demonstrate the relationship among people and the relationship among people and their expertise. In the foregoing, the word "relationship" may be given its normal and usual mathematical meaning as any subset of the Cartesian product of a first set and a second set.

Figure 3:
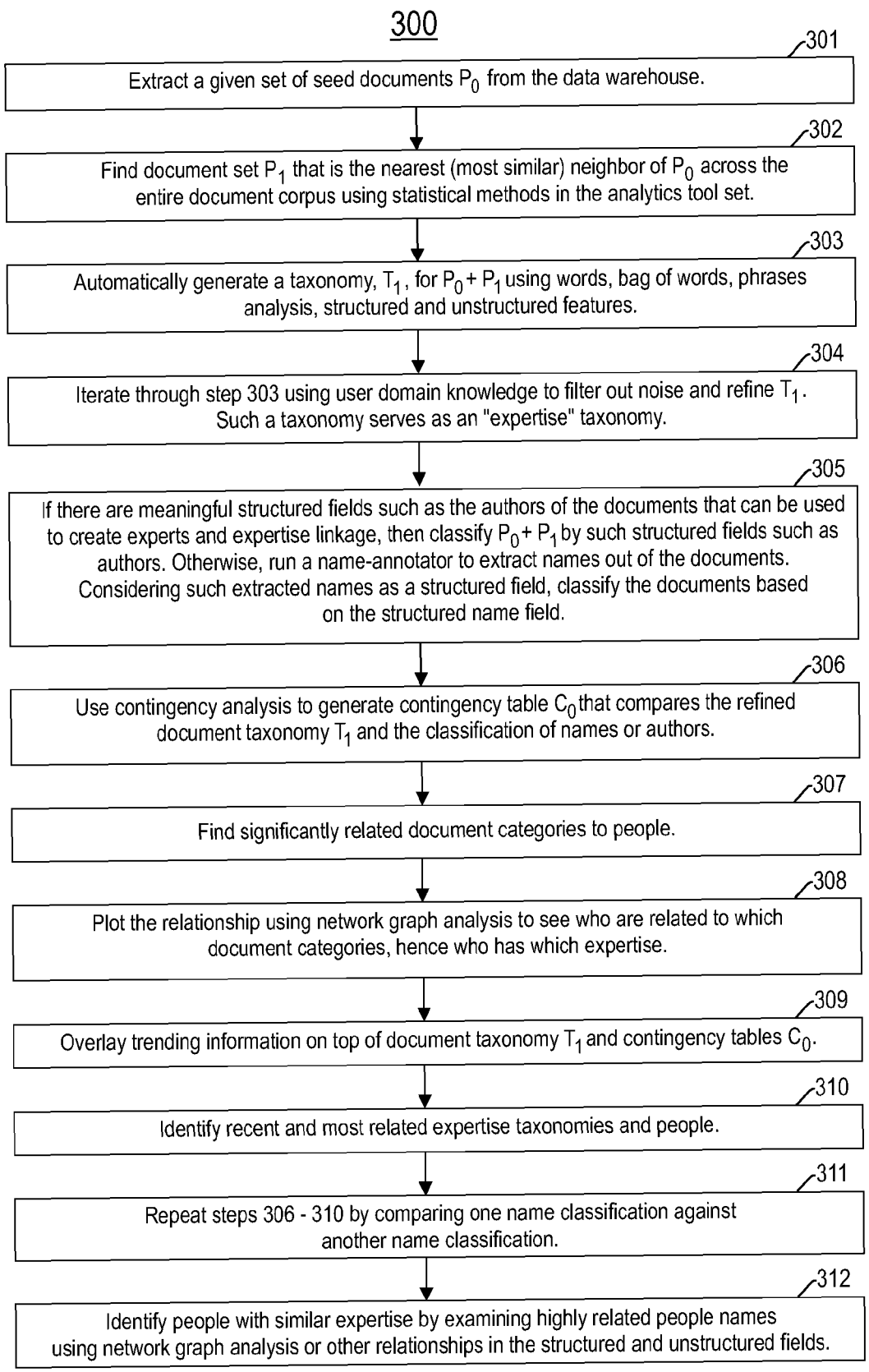
FIG. 3 is a flowchart illustrating a method of locating experts with specific sets of expertise in accordance with an embodiment of the present invention.
Figure 4:
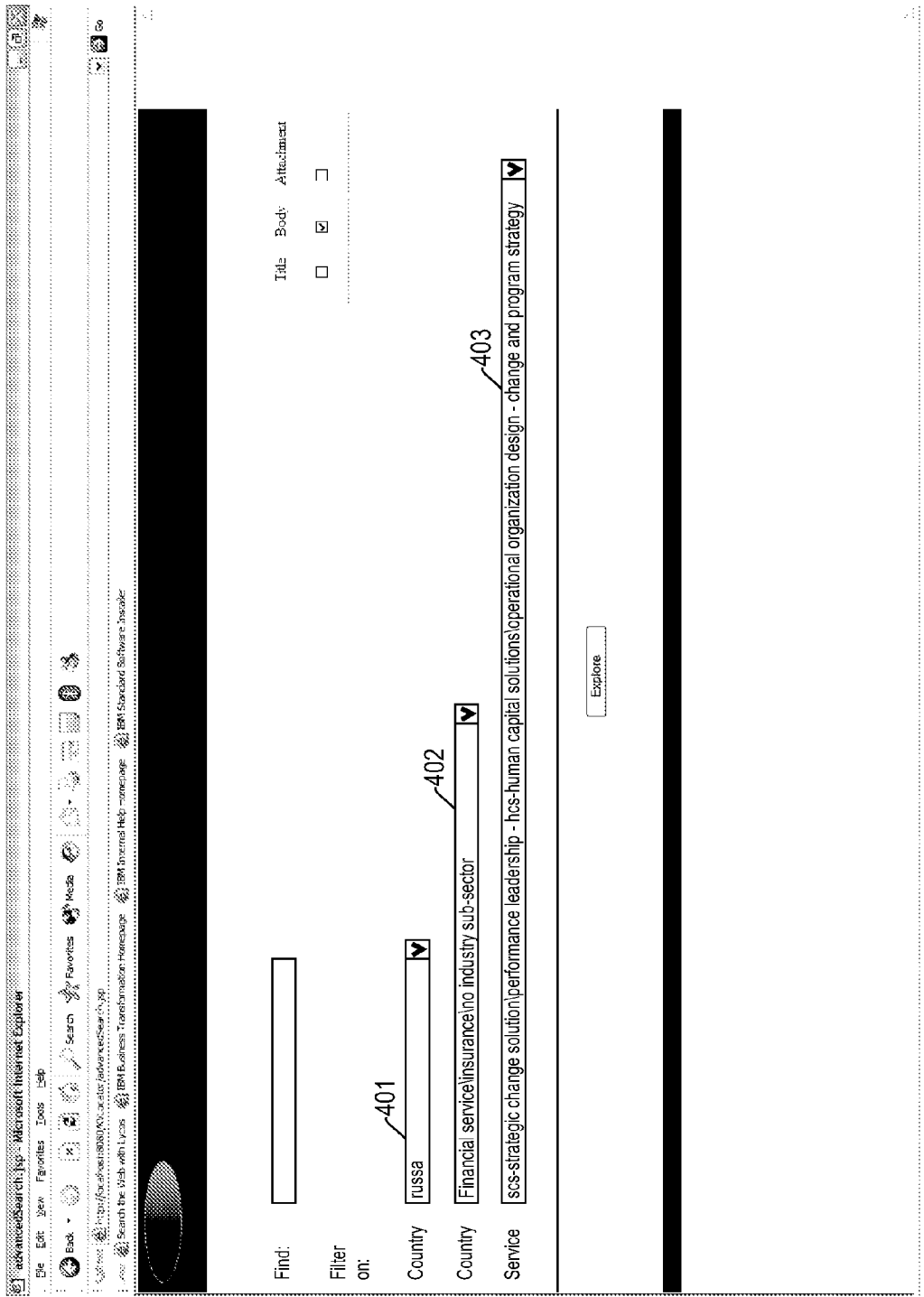
FIG. 4 is an illustration of a graphical user interface for an investigate phase process of the method of FIG. 3.

Referring now to FIG. 3, a method 300 of one embodiment of the present invention may include a process 301 of taking a given set of seed documents $P_0$ and extracting them from the data warehouse 102. For example, computer system 106 may be used to extract a set of relevant documents $P_0$ from a knowledge base (in data warehouse 102) on a given topic using a query of some kind. For example, as shown at query 400 in FIG. 4, one may be interested in finding experts in certain areas within Russia (input 401) and in the financial services area (inputs 402, 403). The related documents may be extracted from the data warehouse 102 using an analytics tool from the set of analytics tools 104. The analytics tool may automatically convert the extracted documents $P_0$ into a numeric vector through words, phrase, and bag of words analysis. For example, computer system 106 through the set of analytics tools 104 may use a method such as that described by U.S. Pat. No. 6,424,971. Such a numeric vector, together with structured information from the documents $P_0$ may then be used for subsequent analysis. It may also be possible that a user of system 100 only knows about one set of seed documents on one or several specific topics.

Further using the analytics tool and continuing with method 300 at process 302, computer system 106 may find a nearest (in the sense of "similarity") neighbor of $P_0$ across the entire document corpus using statistical methods in the analytics tool set 104. For example, for a given inventor's patent, process 302 may extract all of the patents that are similar to that patent through a nearest neighbor search. A nearest neighbor search can be done by selecting a large group of patents that share certain structured characteristics with the initial set $P_0$—such as being in the same patent main class under the United States Patent and Trademark Office (USPTO) patent classification system. The text of these nearest neighbor patents may then be extracted and used to create a vector space model based on a bag-of-words representation. Different documents (patents) can then be compared via a cosine similarity metric. The nearest neighbors to the original seed patents $P_0$ can then be selected for inclusion in the nearest neighbor document set $P_1$. For example, methods of generation of feature spaces from text and comparison of documents using cosine similarity are disclosed by U.S. Pat. No. 6,424,971, referenced above. The combined document set $P_0+P_1$ may be considered to cover the space for the interested patent areas. Process 302 may be considered optional in the sense that method 300 may proceed directly from process 301 to process 303.

Figure 5A:
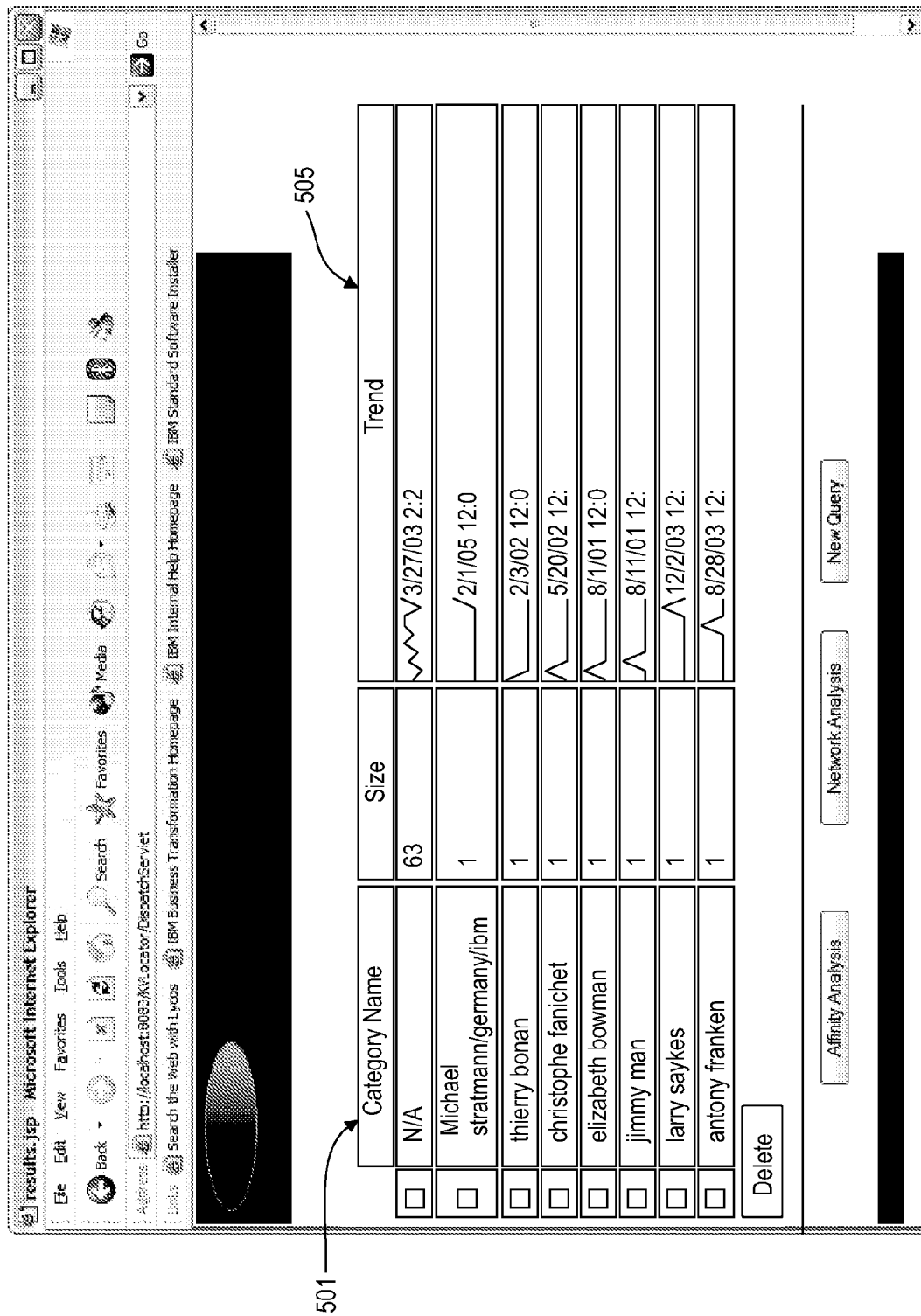
FIGS. 5A and 5B, is an illustration of a graphical user interface for taxonomy generation in the method of FIG. 3.
Figure 5B:
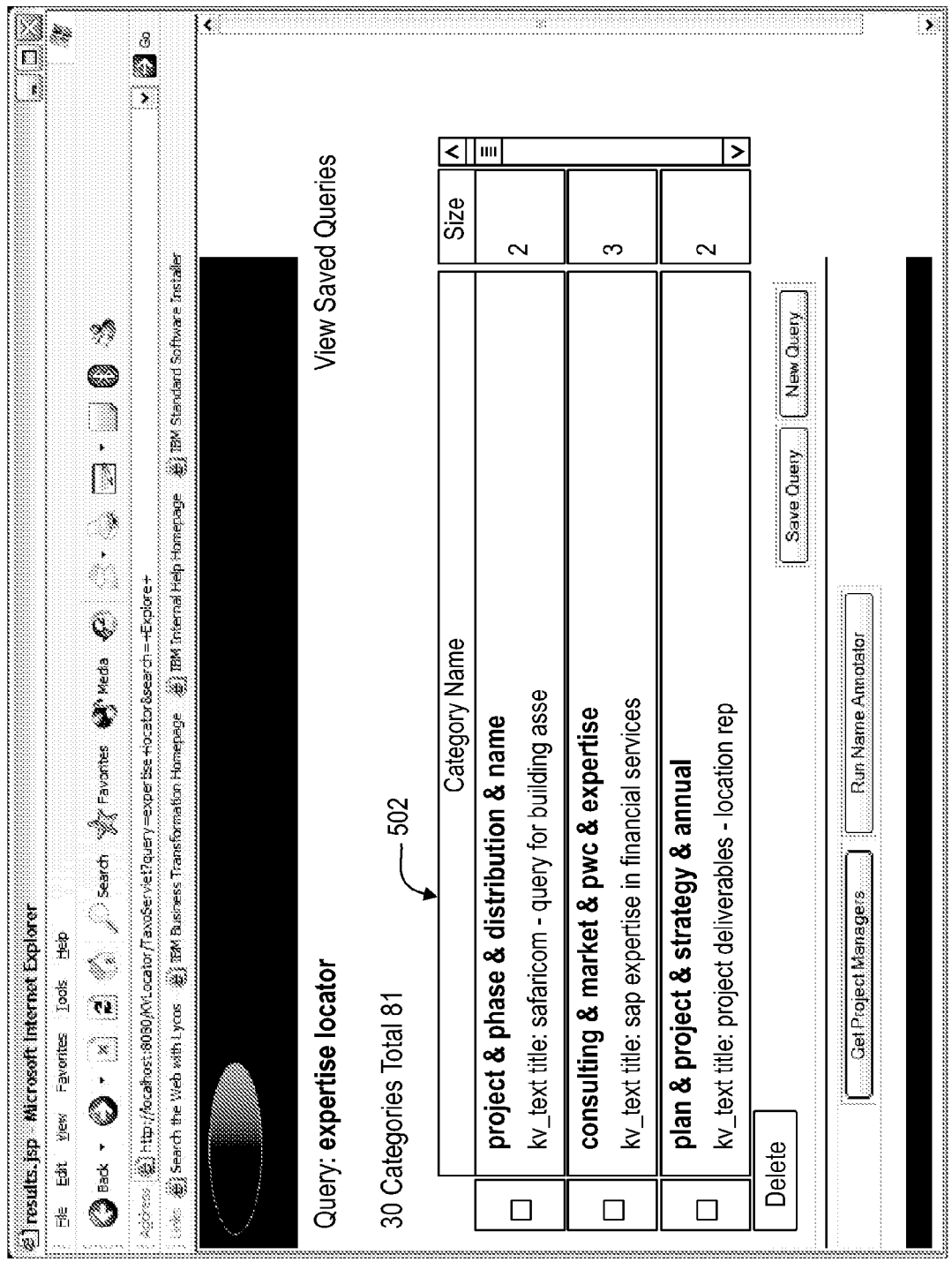

Continuing with method 300 at process 303, computer system 106 may be used to automatically generate a taxonomy, $T_1$, for combined document set $P_0+P_1$—or $P_0$ in case process 302 has been skipped—using words, bag of words, phrases analysis, structured and unstructured features. For example, a patent taxonomy can be generated using a method such as that described in U.S. Pat. No. 6,424,971, referenced above, to show what kinds (e.g., which USPTO patent classes) of patents there are for the extracted patent set $P_0$. Also for example, as illustrated by FIG. 5A and FIG. 5B, computer system 106 may be used to automatically classify the document set $P_0$, extracted in the example illustrated by FIG. 4, using the automatic taxonomy generation techniques that treat the documents as words, generating a feature space for the document set $P_0$ and using clustering technologies such as K-means and other clustering methods to cluster the documents, as disclosed, for example, by Rasmussen, E., "Clustering Algorithms", in Frakes, W. B. and Baeza-Yates, R., editors, Information Retrieval, Data Structures and Algorithms, pages 419-442, Prentice Hall, Englewood Cliffs, N.J. (1992). Once the clusters are generated, additional refinements can be made by merging, deleting, or adding classes. FIGS. 5A and 5B show an example of the generated taxonomy for the document set $P_0$, extracted in the example illustrated by FIG. 4. FIG. 5A shows a first set of categories 501, each category being an author name; and FIG. 5B shows a second set of categories 502. FIG. 5A also illustrates how trend (temporal) information 505 may be included for each category and graphically displayed. The categories 501, 502 may be considered as an expertise category as well.

At process 304, method 300 may continue by iterating processes 301 through 303 using user domain knowledge to filter out noise and refine the taxonomy $T_1$. Such a taxonomy serves as an "expertise" taxonomy. In the first example related to patent documents such user domain knowledge may comprise, for example, some specialized knowledge about the particular technical field of the patents being searched. In the second example related to Russian financial services such user domain knowledge may comprise, for example, some specialized knowledge about a particular geographical area.

At process 305, method 300 may continue by classifying the documents of combined document set $P_0+P_1$—or $P_0$ in case process 302 has been skipped—based on a structured name field. If there are meaningful structured fields—such as the authors of the documents $P_0+P_1$—that can be used to create experts and expertise linkage, then classify $P_0+P_1$ by such structured fields—such as authors. Otherwise, a name-annotator may be run to extract names out of the documents $P_0+P_1$. Such extracted names can be considered as a structured field. Method 300 can then classify the documents $P_0+P_1$ based on the structured name field.

Figure 6:
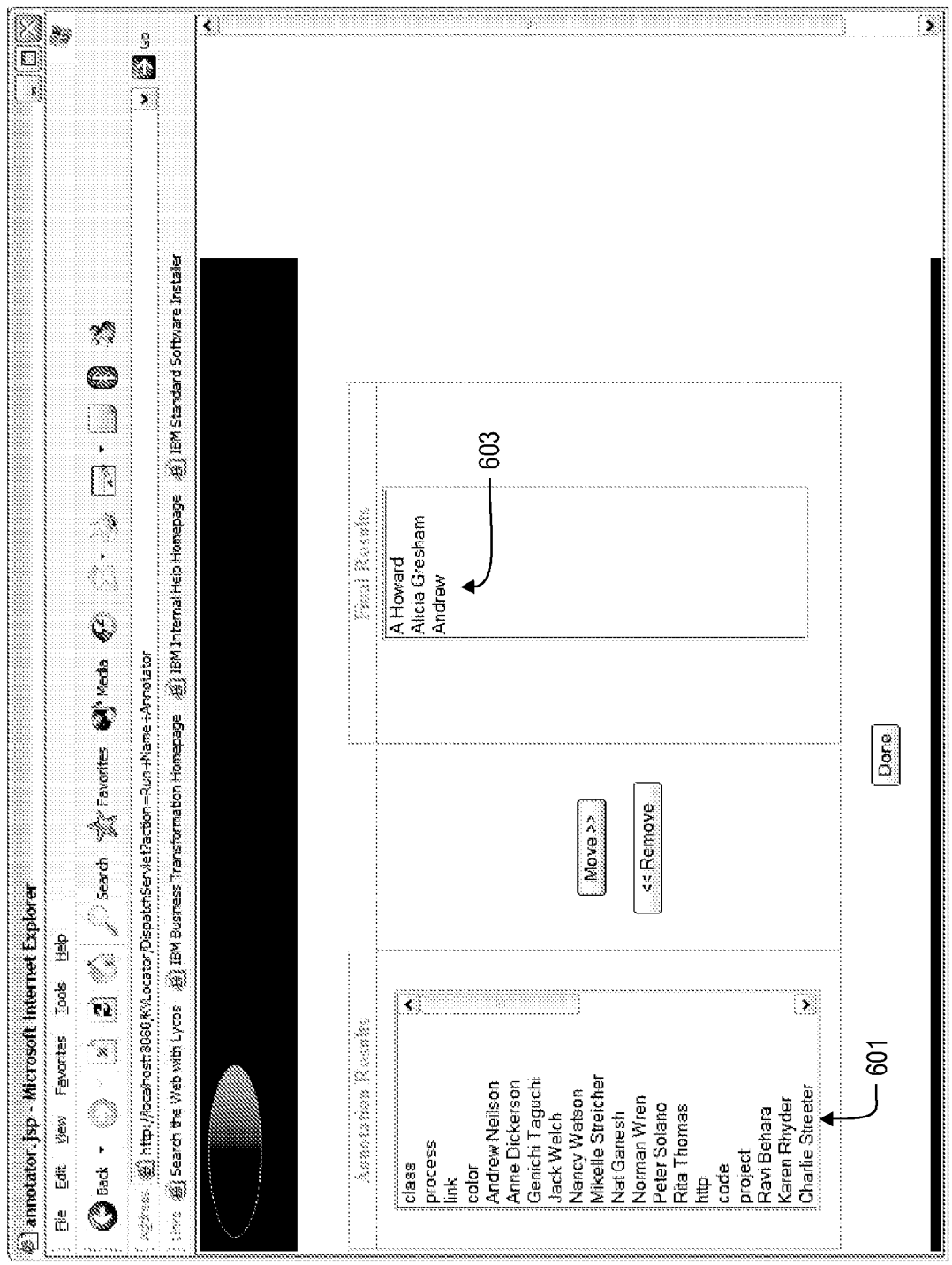
FIG. 6 is an illustration of a name annotation for a process of the method of FIG. 3.

FIG. 6 illustrates an example of running a name annotator. To link expertise with people, one way is to look into structured fields such as the authors of the documents $P_0+P_1$. In a knowledge base, e.g., contained in data warehouse 102, however, the documents $P_0+P_1$ often are generated from collected data sources so that the author information may not be useful. The documents themselves, however, may mention people's names which indicate what they are working on and what they are good at, and so forth. In such cases, one step to extract such people information is to run a name-annotation step over the document set $P_0+P_1$ to extract names out of the documents as shown in FIG. 6. In this case, the name annotation results 601 are shown on the left hand side column and a user may select a set of names 603 to examine further if so desired, as shown on the left hand side column in FIG. 6.

Figure 7:
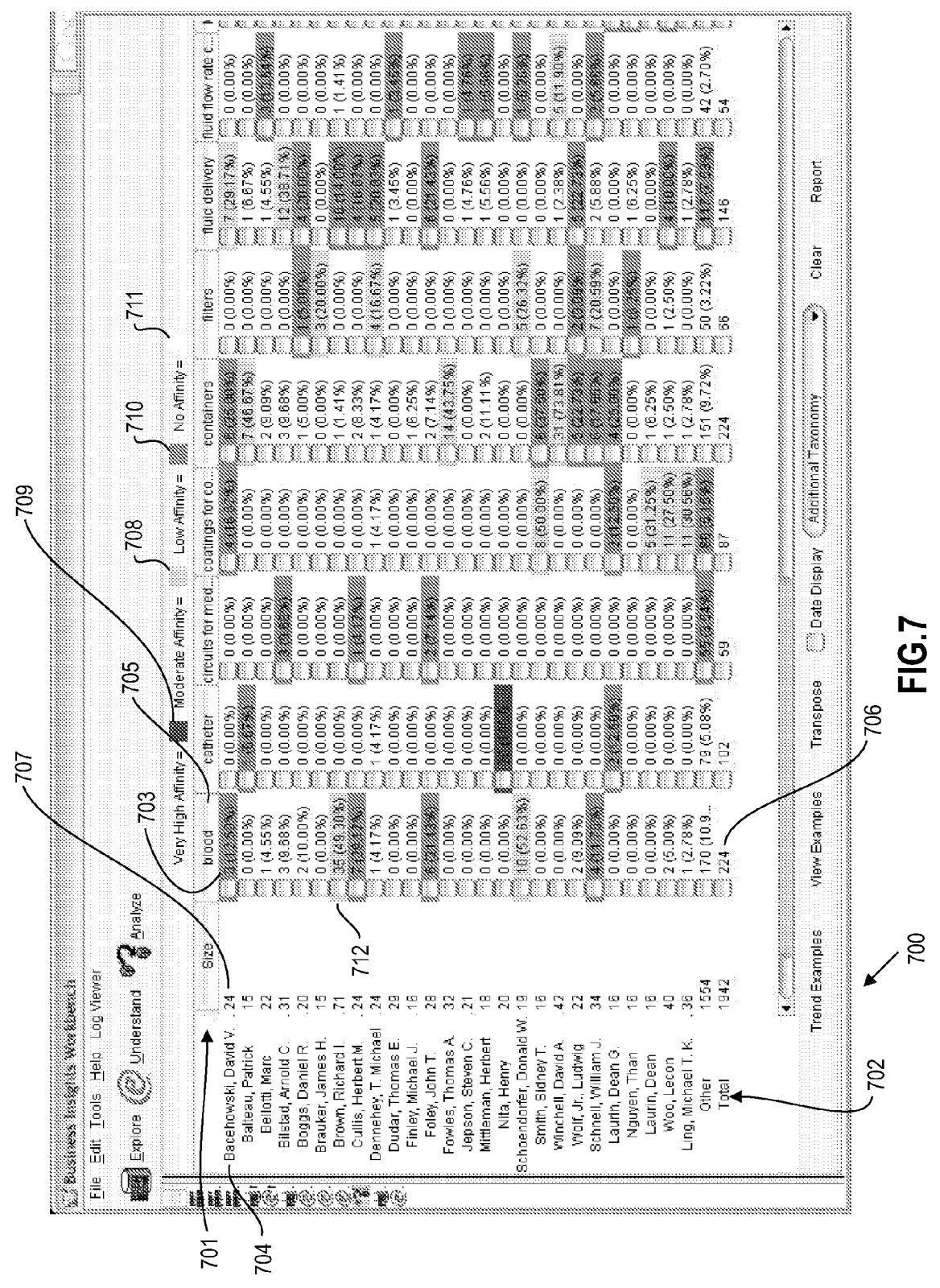

Method 300 may continue at process 306 using contingency analysis to generate a contingency table $C_0$—such as contingency table 700 shown in FIG. 7—that compares the refined (e.g., at process 304) document taxonomy $T_1$ and the classification of names of authors.

In the patent example, the patents may be classified by inventor names using the structured values available in the patent database (from data warehouse 102) and the contingency table $C_0$ can be generated to compare the inventors with the patent categories to show the relationship between the inventors and their specialized expertise areas. Similarly, method 300 can compare one inventor classification to another to see how inventors are related to each other. Such a comparison may be used, for example, to relate two inventors who have a significant number of co-authored inventions.

To comprehend who has what expertise and those who have similar expertise and how they are related to each other, the set of analytics tools 104 may execute a tool in the background to perform a contingency analysis between the names and the expertise categories or between names themselves. Relationships among people and between people and expertise may be derived from the following exemplary forms of contingency analysis: (1) structured fields analysis (e.g., co-authoring of documents); (2) structured and unstructured data analysis (e.g., association of a document with a similar text content to another person); and (3) structured and unstructured data analysis based on sharing a text or structured feature value (e.g., authors located in the same building, or that worked for the same company, or that used the same chemical in research, for example).

The contingency table 700 may display the expertise categories across one axis, e.g., horizontal axis 701 as shown in FIG. 7, and the authors (or inventors) along the other axis, e.g., vertical axis 702 as shown in FIG. 7. The cells—for example, cell 703—may indicate the number of documents that occur at the intersection of author 704 (e.g., "Bacechowski, David V.") and category 705 (e.g., "blood"). Each cell has an expected value which can be calculated based on the size 706 of the category (e.g., size 706 is 224 for the category "blood") and the total number 707 of documents for the author (e.g., total number 707 of documents for author "Bacechowski, David V." is 24).

For example, an expected value percentage for each cell may be calculated as (percent of the author's documents out of the total number for the category)×(percent of the documents in the category out of the total number of documents in all categories). If the expected value is exceeded by the actual value in the cell, then the cell may be shaded. For example, cell 703 is illustrated with a moderate shading that matches moderate affinity shading 708. The degree of shading may indicate the degree of significance of the cell's value, which may be calculated, for example, using a statistical test, such as the well-known chi-squared test (see Press, et al., "Numerical Recipes in C, second edition", New York, Cambridge University Press, (1992), pages 620-623). Shading of each cell may indicate a significant relationship between the author corresponding to the cell and the category corresponding to the cell, and the degree of shading may indicate the degree of significance of the relationship. For example, the moderate affinity shading of cell 703 may indicate a moderate degree (as compared to "very high" 709, "low" 710, and "no" 711 degrees of affinity illustrated in FIG. 7) of significance between author 704 (e.g., "Bacechowski, David V.") and category 705 (e.g., "blood") of cell 703.

Method 300 may continue at process 307 by finding significantly related document categories to people. For example, document category "blood" may be found to be significantly related to people "Bacechowski, David V." and "Brown, Richard I." by the shading of cell 703 and cell 712. As seen by the multiple shaded cells of the example illustrated by FIG. 7, a number of significantly related document categories to people may be found.

At process 308, method 300 may continue by plotting the relationships found—such as significantly related document categories to people—using network graph analysis to aid visualization of who are related to which document categories, hence who has what expertise. A network graph analysis can be used, for example, to generate an inventors' network to show relationships among inventors. Such a network graph may allow a user to find multiple options when locating people. For example, in case one person cannot be found, others who have similar expertise might be located. Additional types of applications to other kinds of people and expertise location may be provided, such as match-making by identifying complimentary skills between two people.

Figure 8:
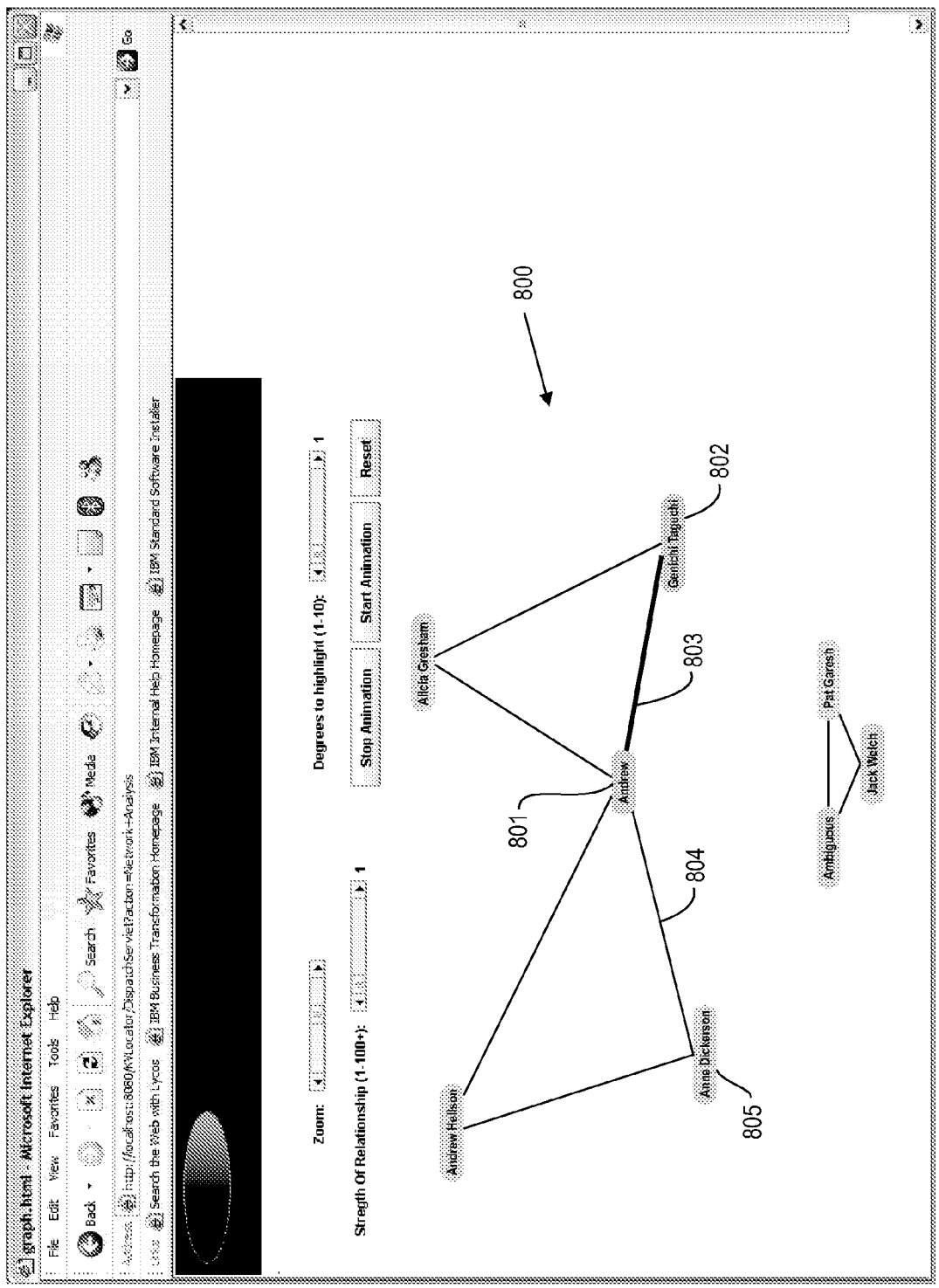
FIG. 8 is an illustration of a network analysis graph for a process of the method of FIG. 3.

FIG. 8 shows an example of a network graph 800 that can be generated to show such relationships as exemplified above in the description of process 307. In addition to generating network graph 800, process 308 may also indicate the strength of the relationship by adding thickness to an edge that links two nodes. The thicker the lines are, the more significantly related the nodes may be. In the example illustrated in FIG. 8, the center person (node 801) may be more significantly related to the person represented by node 802, because the center person (node 801) and the person represented by node 802 may have similar expertise. Thus, the thicker line for edge 803 indicates a more significant relationship than, for example, the thinner line for edge 804, which may indicate a less significant relationship of the center person (node 801) to the person represented by node 805, who, for example, may have expertise less similar to that of the center person than does the person represented by node 802. The network graph 800 also may allow for zooming in and out to aid visualization of the overall network represented by network graph 800 and visualization of specific relationships—such as that between the center person represented by node 801 and the person represented by node 802. Another measure of the relationship between people may be to examine the names that are mentioned in the same documents. If two names are mentioned in the same set of documents, they may also have similar expertise. The set of analytics tools 104 may plot a network graph 800 based, for example, on such measures.

Method 300 may continue at process 309 by overlaying trending information on top of document taxonomy $T_1$, and contingency tables $C_0$. For example, FIG. 5A shows trending information 505 overlaid on a taxonomy $T_1$. Trending information—such as trending information 505—may be added to each cell of a contingency table $C_0$. For example, cell 703 of contingency table 700 contains different types of information, such as number of documents (e.g., 3) and percentage of the documents by the author in that category (e.g., 12.5%) so that trending information may easily be added as one more type information to each cell.

Method 300 may continue at process 310 by identifying recent and most related expertise taxonomies and people using, for example, contingency table 700. "Recent" may defined as desired with respect to some pre-determined time period—for example, as more recent than 5 years, more recent than 1 year, more recent than 3 months, or the like. Similarly, "most related" may be defined as deemed appropriate, using the distance of nearest neighbor methodologies, for example, cosine distance in the feature space, as a measure of most closely related; or, for example, using a statistical correlation or likelihood value from the contingency table as a different measure of "most related".

At process 311, method 300 may repeat processes 306-310 in order to compare one name classification against another name classification. In other words, by iterating processes 306-310, multiple comparisons between all the different name classifications of interest may be obtained.

Method 300 may continue with process 312 to identify people with similar expertise by examining highly (e.g., more closely using distance measure or more related using significance) related people names using network graph analysis with a network graph 800, for example, or other relationships in the structured and unstructured fields.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A method for use with a set of seed documents $P_0$ extracted from a data warehouse, the method comprising:
   searching the data warehouse to provide a set of additional documents $P_1$ similar to documents of $P_0$, wherein said similarity is determined using a query search;
   generating an initial taxonomy for a combined document set $P_0+P_1$ that includes all documents from both the set of seed documents $P_0$ and the set of additional documents $P_1$, wherein said generating of the initial taxonomy includes an analysis using words, bags of words, phrases, structured and unstructured features;
   classifying the combined document set $P_0+P_1$ using terms obtained from structured fields, wherein the structured fields are extracted from the combined document set $P_0+P_1$ wherein at least one of the structured fields includes names of people and is formed using a name annotator to extract names from documents of the combined document set $P_0+P_1$;

generating a contingency table that compares categories of a refined taxonomy to the structured fields in cells and assigns a degree of significance to the comparisons in each cell;

examining the contingency table to find a relationship between the categories of the refined taxonomy and the names of people wherein said relationship is plotted according to the degree of significance of respective cells to determine who is related to which document categories, hence who has what expertise;

overlaying trending information on top of a document taxonomy and contingency table;

using the contingency table to identify recent and most related expertise taxonomies and people;

iterating the processes of extracting, searching, and generating using domain knowledge to produce the refined taxonomy from the initial taxonomy;

comparing one name classification against another name classification in the refined taxonomy; and identifying people with similar expertise by examining highly related people names using network graph analysis or other relationships in the structured and unstructured fields.

2. A computer program product comprising a computer useable medium including a computer readable program, wherein the computer readable program when executed to perform a query search for a predetermined document category on a computer causes the computer to:

access a corpus of documents stored within a data warehouse;

extract a set of documents from the corpus of documents including structured fields wherein at least one of the structured fields further includes authors of the set of documents;

generate a document taxonomy from the set of documents by analyzing words, bags of words, and phrases in the structured fields to identify and classify related documents from the set of documents according to classifications including categories of expertise and the authors of the set of documents;

construct a contingency table of cells having an actual value and having a first axis defined by the authors of the set of documents and a second axis defined by the categories of expertise;

calculate an expected value for each cell in the contingency table based on a size of a selected category of expertise and a total number of documents associated with a selected author;

determine a degree significance for each cell in the contingency table based on a comparison of the actual value and the expected value for each cell in the contingency table, and code each cell in the contingency table according to the degree of significance;

plot a relationship between the categories of expertise and the authors of the set of documents based on the degree of significance found for each cell of the contingency table as a network graph using lines of varying thickness to signify a strength of the relationship;

perform a first network graph analysis to find a set of names from the authors of the set of documents that is most related to a set of the categories of expertise;

perform a second network graph analysis to find a co-authoring relationship from the found set of names that is most related to the set of the categories of expertise;

overlay trend information on top of the document taxonomy and the contingency table; and identify people of similar expertise by analyzing the contingency table, document taxonomy, first and second graph analyses, and trend information.

* * * * *